United States Patent [19]
Wölfges

[11] 3,881,358
[45] May 6, 1975

[54] APPARATUS FOR MEASURING FLUID PRESSURE AT A PLURALITY OF MEASURING POINTS

[75] Inventor: Hans Wölfges, Lohr/Main, Germany

[73] Assignee: Gesellschaft fur Hydraulik-Zubehor mbH, Sulzach/Saar, Germany

[22] Filed: Aug. 22, 1973

[21] Appl. No.: 390,562

[30] Foreign Application Priority Data
Aug. 25, 1972 Germany............................ 2241883

[52] U.S. Cl. ................................................. 73/420
[51] Int. Cl. ............................................ G01l 19/00
[58] Field of Search ...... 73/420; 137/625.11, 625.19

[56] References Cited
UNITED STATES PATENTS
3,157,199  11/1964  Banks et al. .................... 137/625.11
3,246,667  4/1966  Pemberton..................... 137/625.11

*Primary Examiner*—Donald O. Woodiel
*Attorney, Agent, or Firm*—Michael S. Striker

[57] ABSTRACT

Apparatus for measuring fluid pressure at any one of a plurality of measuring points has a valve wherein the flange at one end of a stationary cylindrical member has several inlets each of which is connected or connectable with a different measuring point and discrete channels each of which communicates with an inlet and each of which has a discharge end at the periphery of the cylindrical member. A sleeve which is rotatably mounted on the cylindrical member has a connecting channel which can connect a selected discharge end, and hence a selected measuring point, with a peripheral groove of the cylindrical member. The latter carries a pressure gauge and has a first outlet which communicates with the interior of the gauge and a second outlet which is connected with a tank. At least one radial bore in the cylindrical member connects the groove with the first inlet. The sleeve connects the first outlet with the second outlet whenever it is indexed to move its connecting channel from register with a preceding discharge end into register with the next-following discharge end. The connecting channel or by way of a discrete second channel in the sleeve.

11 Claims, 6 Drawing Figures

APPARATUS FOR MEASURING FLUID PRESSURE AT A PLURALITY OF MEASURING POINTS

BACKGROUND OF THE INVENTION

The present invention relates to apparatus for measuring fluid pressure, and more particularly to improvements in apparatus for selectively measuring fluid pressure at any one of a plurality of measuring points by resorting to a single pressure gauge.

It is already known to combine a pressure gauge with a selector valve which can connect a selected measuring point with the pressure inlet of the gauge. The valve includes a body having a plurality of inlets each of which is connected with a different measuring point and an axial bore for a sleeve-like valve member which is formed with channel means for connecting a selected inlet with the pressure gauge. The valve member has an axially extending recess for a cylindrical member which is connected with the pressure gauge. The cylindrical member is secured to a cover of the valve body so that it cannot rotate with the valve member and has a circumferential groove communicating with an axial bore which conveys fluid to the pressure gauge. The channel means in the valve member can connect a selected inlet of the valve body with the groove of the cylindrical member whereby such inlet communicates with the pressure inlet of the gauge.

The space between the cover of the valve body and the valve member is connected with the tank whereby the fluid in such space acts against the adjacent end force of the valve member with a pressure which is proportional to tank pressure. Since the area of the just mentioned end face of the valve member is relatively large, it happens again and again that fluid acting against such end face offers an excessive resistance to rotation of the valve member between several angular positions in each of which the channel means of the valve member communicates with a different measuring point. In other words, friction between the valve member and the valve body is likely to reach a value at which the indexing of the valve member to a different angular position necessitates the exertion of an inordinately large force. Moreover, such high tank pressure can cause excessive leakage of fluid, especially if the connections between the measuring points and the sources of pressurized fluid whose pressure is to be determined utilize capillary tubes. Excessive leakage of fluid can result in false readings of fluid pressure.

SUMMARY OF THE INVENTION

An object of the invention is to provide a novel and improved apparatus for measuring fluid pressure at any one of a plurality of measuring points which is constructed and assembled in such a way that the facility with which the valve member which serves to connect the pressure gauge with a selected measuring point is not affected by fluctuations in tank pressure.

Another object of the invention is to provide a simple, rugged and reliable measuring apparatus which comprises a small number of parts and wherein the leakage of fluid is a small fraction of leakage in conventional measuring apparatus.

A further object of the invention is to provide a fluid pressure measuring apparatus wherein the pointer of the pressure gauge invariably assumes a predetermined starting position whenever the apparatus is manipulated to connect the gauge with a different measuring point.

An additional object of the invention is to provide a novel and improved selector valve which can be used in an apparatus of the just outlined character as a superior substitute for conventional selector valves.

Still another object of the invention is to provide a novel connection between the valve member and the pressure gauge of the improved fluid pressure measuring apparatus.

The invention is embodied in an apparatus for measuring the pressure of fluid media at a plurality of measuring points. The apparatus comprises a selector valve including a stationary member which can resemble a differential piston and is provided with a plurality of inlets each connectable to a different measuring point (e.g., by means of a flexible hose or nipple) and an outlet, and a rotary valve member which preferably resembles a cylindrical sleeve and preferably surrounds a smaller-diameter cylindrical portion of the stationary member, at least one connecting channel means provided in the valve member, means for indexing the valve member between a plurality of angular positions in each of which the channel means establishes communication for the flow of a fluid medium between the outlet and a different inlet of the stationary member, and a pressure gauge connected to the outlet of the stationary member so that it can indicate the fluid pressure at a selected inlet of the stationary member in response to indexing of the valve member to the corresponding angular position.

The stationary member may be further provided with a second outlet which is preferably connected to a tank for a fluid medium, and the valve member is preferably arranged to establish communication between the second outlet and the outlet for the pressue gauge whenever the valve member is indexed from a preceding to a next-following angular position or vice versa so that the pressure at the first mentioned outlet matches the pressure at the second outlet before the gauge is connected with a next-following inlet subsequent to measurement of fluid pressure at the preceding inlet.

The novel features which are considered as characteristic of the invention are set forth in particular in the appended claims. The improved measuring apparatus itself, however, both as to its construction and its mode of operation, together with additional features and advantages thereof, it will be best understood upon perusal of the following detailed description of certain specific embodiments with reference to the accompanying drawing.

DESCRIPTION OF THE PREFERRED EMBODIMENTS

Figure 1:
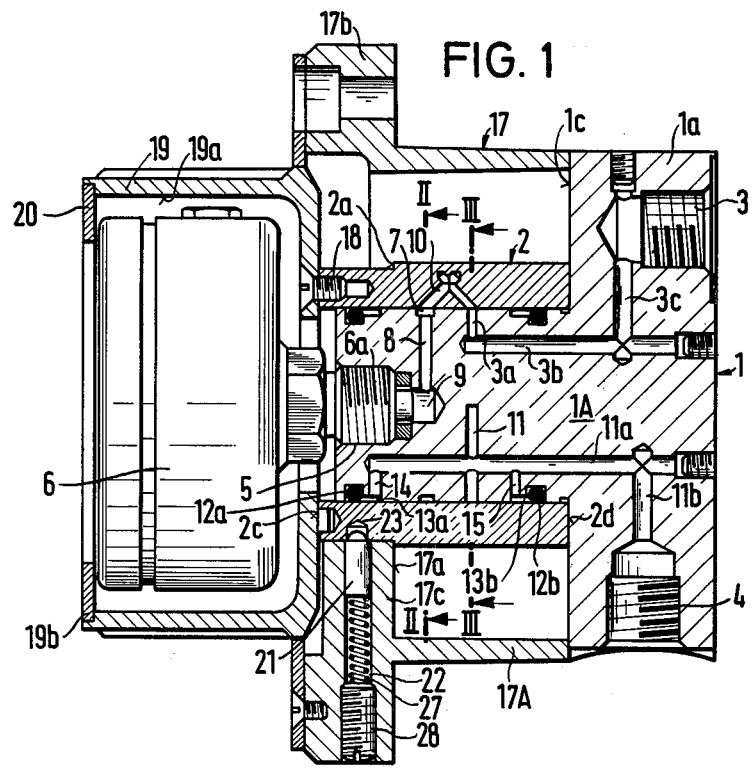
FIG. 1 is an axial sectional view of an apparatus which embodies one form of the invention.

Referring first to FIG. 1, there is shown a selector valve which comprises a housing or body 17 having a cylindrical end portion 17A which is rigidly connected with the flange 1a of a stationary piston 1. The smaller-diameter cylindrical portion 1A of the piston is surrounded by an indexible sleeve-like valve member 2 which is connected with a rotary knob 19.

The exposed end face of the flange 1a of the piston 1 is provided with an annulus of equidistant inlets in the form of tapped bores 3 which are connectable to discrete measuring points, e.g., to discrete sources of pressurized fluid (not shown), or to the individual machine tool drives such as chucking cylinders, feed cylinders for long and transverse slides, and also turret slides, in which case the working pressure must be measured. The fluid pressure in such sources can be measured by a pressure gauge 6 having a plug 6a receivable in a tapped bore 5 provided in the left-hand end face of the cylindrical piston portion 1A. The flange 1a of the piston 1 is further provided with a radially inwardly extending tapped bore or outlet 4 for connection to a tank or reservoir, not shown.

Figure 3:
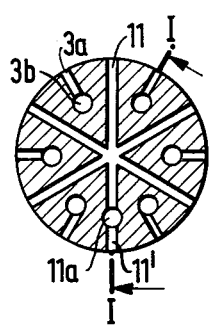
FIG. 3 is a sectional view as seen in the direction of arrows from the line III—III of FIG. 1.
Figure 2:
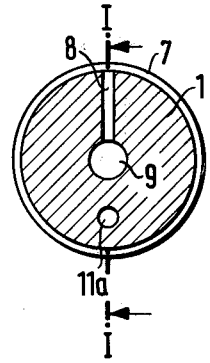
FIG. 2 is a sectional view as seen in the direction of arrows from the line II—II of FIG. 1.

The inner end portion of the outlet 4 communicates with a radially inwardly extending bore 11b which communicates with an axially parallel bore 11a of the piston 1. The inner end portion of each axially parallel bore 3b communicates with a radially outwardly extending bore 3a which terminates at the periphery of the smaller-diameter portion 1A of the piston 1. The inner end portion of each inlet 3 communicates with a radially inwardly extending bore 3c which communicates with an axially parallel blind bore 3b of the piston 1. The radial bores 3a are coplanar and alternate with radially extending bores 11 one of which (numbered 11' in FIG. 3) communicates with an intermediate portion of the axially parallel bore 11a (see FIG. 3). The inner end portions of the radial bores 11 communicate with each other at the axis of the piston 1. It will be noted that each of the radial bores 11 communicates with the bore 4 and hence with the tank because the bore 11a communicates with the bore 11' which, in-turn, communicates with the bores 11.

The sleeve-like valve member 2 is provided with a connecting bore or channel 10 which can establish communication between a selected radial bore 3a (and hence a selected inlet 3) and a circumferential groove 7 which is machined into the periphery of the small-diameter portion 1A of the piston 1. Further more, the passage 10 can connect the groove 7 with a selected radial bore 11 (i.e., with the outlet 4). The groove 7 is in communication with a radially inwardly extending bore 8 which, in turn, communicates with the hollow plug 6a of the pressure gauge 6 by way of an axially extending outlet 9 in the smaller-diameter portion 1A of the piston 1. By indexing the sleeve 2 relative to the piston 1, an operator can connect the outlet 9 and the gauge 6 with a selected source of pressurized fluid (i.e., with a selected inlet 3) or with the tank (i.e., with the outlet 4).

The means for preventing leakage of fluid between the peripheral surface of the smaller-diameter portion 1A of the piston 1 and the internal surface of the valve member 2 comprises two ring-shaped sealing elements 12a, 12b which are received in peripheral grooves 13a, 13b of the piston. The grooves 13a, 13b for the sealing elements 12a, 12b communicate with radially inwardly extending relief ports 14, 15 which, in turn, communicate with the axially parallel bore 11a so that the pressure in the grooves for the sealing elements equals the pressure in the tank and outlet 4. The ports 14, 15 flank the radial bore 11', as considered in the axial direction of the piston 1. As shown in FIG. 1, the grooves 13a, 13b comprise shallow extensions which respectively communicate with the radial ports 14, 15.

That end portion of the sleeve-like valve member 2 which faces away from the flange 1a of the piston 1 has a smaller diameter so that the valve member forms an external annular shoulder 2a. The shoulder 2a is engaged by the surface 17a of an inwardly extending projection or nose 17c of the housing 17. The housing 17 is further provided with an external annular flange 17b having axially parallel holes for for reception of fasteners (not shown) which secure the housing 17 to a dashboard, control panel or another supporting structure. As mentioned before, the end portion 17A of the housing 17 is rigidly connected with the flange 1a of the piston 1. It will be noted that the sleeve-like valve member 2 is rotatable in the space between the left-hand end face 1c of the flange 1a and the surface 17a of the projection 17b. The valve member 2 has an end face 2b which abuts against the end face 1c. The other end face 2d of the valve member 2 is secured to the knob 19 by means of screws 18 or other suitable fasteners. The knob 19 has an axially extending recess 19a for the pressure gauge 6.

In order to facilitate the indexing of valve member 2 to a selected angular position, the knob 19 carries a ring-shaped scale or dial 20 whose graduations can be moved into register with an index or marker (not shown) on the casing of the gauge 6.

The structure of FIG. 1 further comprises detent means for yieldably holding the valve member 2 in a selected angular position. The detent means comprises a detent pin 21 which extends radially of the valve member 2 and is reciprocable in a bore 22 of the projection 17c of the housing 17 so as to enter a selected blind bore 23 machined into the peripheral surface of the valve member 2. The detent pin 21 is biased radially inwardly by a helical spring 27 which is received in the bore 22 of the projection 17c and reacts against a plug 28 which is threaded into the projection 17c so as to close the outer end of the bore 22. The number of blind bores 23 corresponds to the desired number of selected angular positions of the valve member 2, i.e., to the maximum number of measuring points.

Each bore 3c constitutes with the respective bores 3b, 3a a first channel whose discharge end (bore 3a) is at the periphery of the cylindrical portion 1A. The discharge ends (bores 3a) of these first channels are adjacent to the path of movement of the right-hand leg of the connecting channel 10 whose left-hand leg is in permanent communication with the groove 7 and hence with the outlet 9 and gauge 6. When the valve member 2 is indexed, its channel 10 travels along successive discharge ends (bores 3a) of the channels 3a–3c until it reaches a selected discharge end whereby the corresponding inlet 3 (and the corresponding measuring point) is in communication with the outlet 9.

The radial bores 11 of the piston 1 constitute second channels each of which communicates with the tank (i.e., with the outlet 4) and each of which has an intake end at the periphery of the cylindrical portion 1A. The intake ends of the channels or bores 11 alternate with the discharge ends (bores 3a) of the channels 3a–3c. Thus, when the valve member 2 moves the connecting channel 10 from register with a preceding bore 3a toward register with the next-following bore 3a, the channel 10 moves into register with the intake end of a channel or bore 11 whereby the outlet 9 of the cylindrical portion 1A (and hence the gauge 6) is connected with the oulet 4. This insures that the pressure in the gauge 6 matches the tank pressure before the channel 10 reaches the next-following bore 3a.

Figure 4:
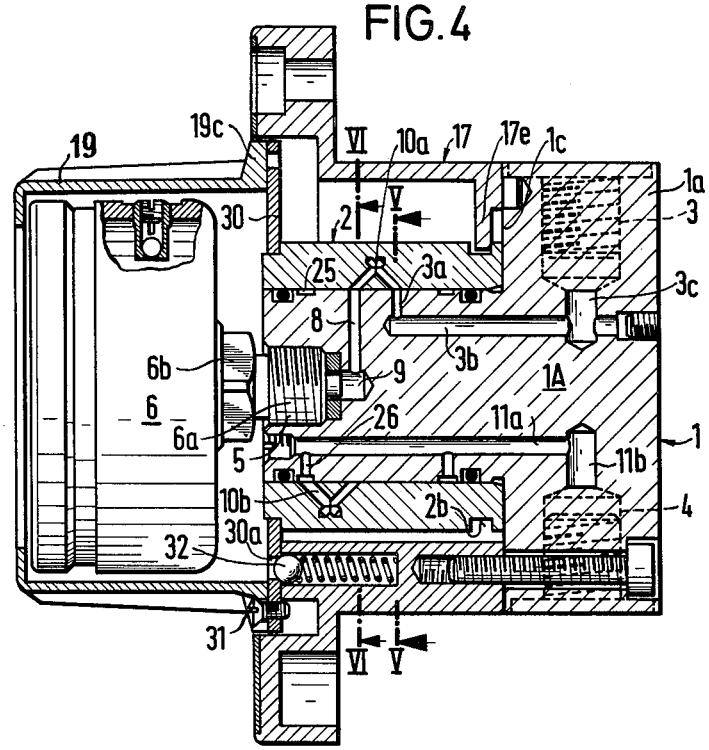
FIG. 4 is an axial sectional view of a second apparatus.
Figure 5:
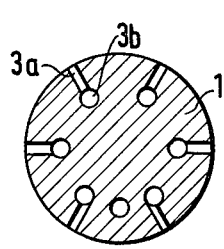
FIG. 5 is a sectional view as seen in the direction of arrows from the line V—V of FIG. 4.
Figure 6:
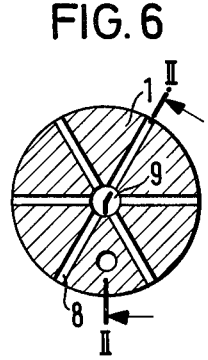
FIG. 6 is a sectional view as seen in the direction of arrows from the line VI—VI of FIG. 4.

Referring to FIG. 4 there is shown a modified measuring apparatus wherein all such parts which are identical with or clearly analogous to the corresponding parts of the apparatus of FIG. 1 are denoted by similar reference characters. A difference between the two apparatus is that the axial bore or oulet 9 of FIG. 4 communicates with the plurality of radially outwardly extending bores or channels 8, one for each of the inlets 3 in the flange 1a of the piston 1 or one for each bore 3a in the smaller-diameter portion 1A of the piston. Each bore 8 is coplanar with a bore 3a, i.e., the bores 8 are located in discrete planes each of which includes the axis of the piston 1 and each of which is also the plane of one of the bores 3a. The connecting channel 10a of the sleeve-like valve member 2 can be moved into register with the outer end portion (intake end) of a selected bore 8 and then communicates with the outer end portion of the respective bore 3a. The valve member 2 is further provided with a second connecting channel 10b which can be moved into register with the outer end of a selected bore 8 and is in permanent communication with a peripheral groove 25 of the piston portion 1A. The groove 25 communicates with a radially inwardly extending port 26 whose inner end portion is in communication with the blind bore 11a and hence with the tank (by way of the outlet 4). As shown in FIG. 4, the channel 10a is V-shaped and is located mainly to the right of the plane of the bores 8, i.e., between the common plane of the bores 8 and the flange 1a of the piston 1. The channel 10b is also V-shaped but is located to the left of the common plane of the bores 8, i.e., between such common plane and the gauge 6. The channels 10a and 10b are angularly offset relative to each other (as considered in the circumferential direction of the piston 1) in such a way that the channel 10b does not communicate with any of the bores 8 when the channel 10a communicates with a selected bore 8 and the respective bore 3a, or vice versa. This means that the pressure in the gauge 6 is relieved when the channel 10b communicates with a bore 8 and that the gauge 6 receives pressurized fluid from one of the inlets 3 when the corresponding bore 3a communicates with the channel 10a. In other words, when the valve member 2 is rotated from a preceding angular position (in which the channel 10a communicates with a first inlet 3) to the next angular position (in which the channel 10a communicates with the next inlet 3), the pressure in the gauge 6 6 is automatically relieved somewhere between the two angular positions of the valve member 2 because the channel 10b communicates with a bore 8 before the channel 10a moves from register with a preceding bore 8 into register with the next-following bore 8. Consequently, the pointer of the gauge 6 automatically returns to zero position or another starting position during the interval between any two consecutive measurements.

The valve member 2 of FIG. 4 is further provided with a circumferential groove or recess 2b for a radially inwardly extending projection 17e of the housing or body 17. The projection 17e cooperates with the left-hand end face 1c of the flange 1a to hold the valve member 2 against axial movement relative to the piston 1. The left-hand end of the valve member 2 of FIG. 4 is rigid with a plate-like carrier 30 which is further connected with a flange 19c of the knob 19 by means of screws 31 or analogous fasteners. Such detachable mounting of the knob 19 renders it possible to gain access to the pressure gauge 6 merely by removing the screws 31 so that the knob 19 can be separated from the plate 30 on the valve member 2. The plug 6a of the gauge 6 includes a hexagonal portion 6b which can be reached by a conventional wrench upon detachment of the knob 19 so as to facilitate replacement of the illustrated gauge 6 with a differently calibrated gauge.

The plate or carrier 30 is further provided with recesses or notches 30a for a spring-biased spherical detent element 32 in the housing 17. The element 32 penetrates into an adjacent notch 30a whenever the valve member 2 is indexed to one of several positions in which the outlet 9 for the gauge 6 communicates with a selected inlet 3 of the flange 1a. The number of notches 30a may be such that the element 32 also penetrates into a notch 30a whenever the channel 10b connects the outlet 4 with the outlet 9.

It is clear that the improved measuring apparatus may be further modified in a number of ways without departing from the spirit of the invention. For example, the number of inlets 3 in the flange 1a can be increased or reduced, the configuration of the channel 10, 10a and/or 10b can be changed, the manner in which the sleeve-like valve member 2 is held against axial movement and/or indexed can be altered, and the knob 19 can be replaced with differently configurated and/or dimensioned indexing means for the valve member.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

1. Apparatus for measuring fluid pressure at a plurality of measuring points, comprising a selector valve including a stationary member having a cylindrical portion and an end face and including a plurality of inlets each connectable to a different measuring point and an outlet, and a rotary valve member mounted on and surrounding said cylindrical portion of said stationary member and having connecting channel means, said valve member being indexible between a plurality of angular positions in each of which said channel means establishes communication between said outlet and a different inlet of said stationary member; and a pressure gauge connected with said outlet and located adjacent to said end face of said cylindrical portion.

2. Apparatus as defined in claim 1, further comprising means for indexing said valve member between said angular positions.

3. Apparatus as defined in claim 1, wherein said valve member comprises a substantially plate-like carrier and further comprising indexing means for said valve member, said indexing means being separately secured to said carrier.

4. Apparatus as defined in claim 1, wherein said stationary member comprises a flange adjacent to one end of said cylindrical portion, said valve member having an end face abutting against said flange.

5. Apparatus as defined in claim 4, wherein said inlets are provided in said flange and said cylindrical portion has an end face facing away from said flange, said gauge being adjacent to said end face of said cylindrical portion.

6. Apparatus for measuring fluid pressure at a plurality of measuring points, comprising a selector valve including a stationary member having a plurality of inlets each connectable to a different measuring point and a first and a second outlet, and a rotary valve member mounted on said stationary member and having channel means, said valve member being indexible between a plurality of first angular positions in each of which said channel means establishes communication between said first outlet and a different inlet of said stationary member and being further indexible to a plurality of second angular positions which alternate with said first angular positions and in each of which said valve member establishes communication between said first outlet and said second outlet; and a pressure gauge connected with said first outlet.

7. Apparatus as defined in claim 6, wherein said channel means is movable along a predetermined path in response to indexing of said valve member and said stationary member is provided with a plurality of first channels each communicating with one of said inlets and each having a discharge end adjacent to said path, said stationary member being further provided with a plurality of second channels each communicating with said second outlet and each having an intake end adjacent to said path, said intake ends alternating with said discharge ends, as considered in the direction of movement of said channel means along said path.

8. Apparatus as defined in claim 7, wherein said first and second channels comprise portions adjacent to the respective discharge and intake ends and extending substantially radially of said valve member, said channel means being in permanent communication with said first mentioned outlet.

9. Apparatus as defined in claim 6, wherein said valve member is further provided with second channel means and said first mentioned and second channel means are respectively moved along first and second paths in response to indexing of said valve member, said stationary member having a plurality of first channels each communicating with one of said inlets and each having a discharge end adjacent to said first path and with a plurality of second channels each connected with said second outlet and each having an intake end adjacent to said second path, said first and second channel means being angularly offset relative to each other, as considered in the circumferential direction of said valve member, so that said first mentioned channel means communicates with one of said discharge ends while said second channel means is sealed from the neighboring intake ends and vice versa.

10. Apparatus for measuring fluid pressure at a plurality of measuring points, comprising a selector valve including a stationary member of cylindrical configuration and having an end face and a plurality of inlets each connectable to a different measuring point, and an outlet, and a rotary valve member mounted on said stationary member and having connecting channel means, said valve member being indexible between a plurality of angular positions in each of which said channel means establishes communication between said outlet and a different inlet of said stationary member; a pressure gauge connected with said outlet and located adjacent to said end face and said cylindrical member; and indexing means for said valve member, said indexing means comprising an annular member secured to said valve member and surrounding said gauge.

11. Apparatus for measuring fluid pressure at a plurality of measuring points, comprising a selector valve including a stationary member having a plurality of inlets each connectable to a different measuring point and an outlet, and a rotary valve member mounted on said stationary member and having connecting channel means, said valve member being indexible between a plurality of angular positions in each of which said channel means establishes communication between said outlet and a different inlet of said stationary member; a pressure gauge connected with said outlet; and a rotary indexing means including an annular member secured to said valve member and externally surrounding said gauge for manual turning operation.

* * * * *